US007999552B2

United States Patent
Babour et al.

(10) Patent No.: US 7,999,552 B2
(45) Date of Patent: Aug. 16, 2011

(54) SENSOR CABLE FOR ELECTROMAGNETIC SURVEYING

(75) Inventors: Kamal Babour, Bures sur Yvette (FR); Leendert Combee, Sandvika (NO); James P. Brady, Houston, TX (US); Martin Howlid, Blommenholm (NO)

(73) Assignee: WesternGeco L.L.C., Houston, TX (US)

( * ) Notice: Subject to any disclaimer, the term of this patent is extended or adjusted under 35 U.S.C. 154(b) by 554 days.

(21) Appl. No.: 12/132,534

(22) Filed: Jun. 3, 2008

(65) Prior Publication Data
US 2009/0295394 A1 Dec. 3, 2009

(51) Int. Cl.
*G01V 3/08* (2006.01)
(52) U.S. Cl. ........................................ 324/365
(58) Field of Classification Search .................. 324/365
See application file for complete search history.

(56) References Cited

U.S. PATENT DOCUMENTS

| | | | |
|---|---|---|---|
| 4,617,518 A | 10/1986 | Srnka | |
| 6,236,211 B1 | 5/2001 | Wynn | |
| 7,002,350 B1 | 2/2006 | Barringer | |
| 7,203,599 B1 | 4/2007 | Strack et al. | |
| 2006/0091889 A1 | 5/2006 | Ellingsrud et al. | |

FOREIGN PATENT DOCUMENTS
WO 2005006022 A1 1/2005

OTHER PUBLICATIONS

Thompson, et al., Marine Geophysical Prospecting System, United States Statutory Invention Registration, Published Sep. 5, 1995, Registration No. H1490.

*Primary Examiner* — Reena Aurora

(57) ABSTRACT

A sensor cable for surveying. The sensor cable may comprise at least one pair of current sensor electrodes and an amplifier. The current sensor electrodes may be disposed along opposite sides of the sensor cable. The current sensor electrodes may be configured to detect current in an electromagnetic field transverse to an inline direction of the sensor cable. The amplifier may be configured to amplify the current in the electromagnetic field for detection by the electrode pair.

23 Claims, 3 Drawing Sheets

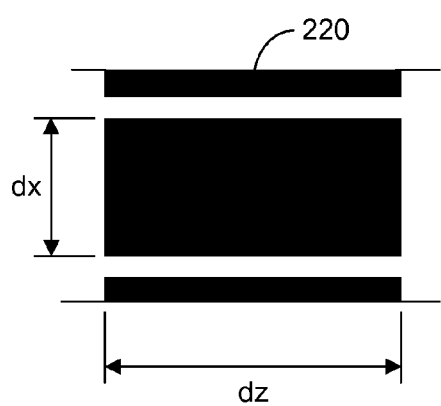
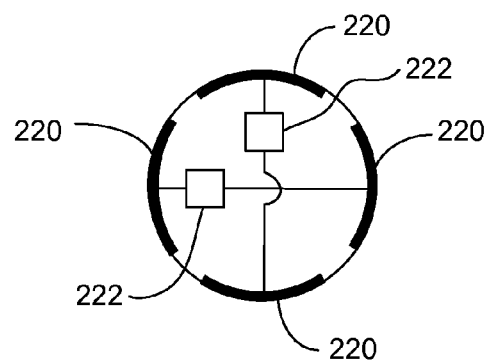
FIG. 2C    FIG. 2A
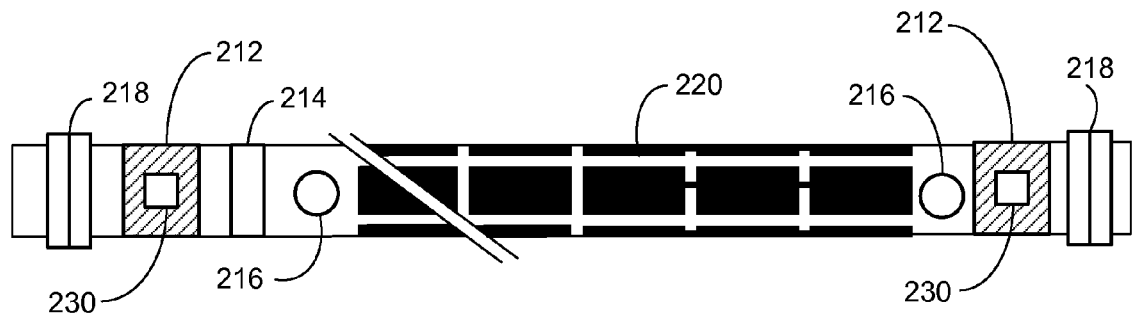
FIG. 2B

SENSOR CABLE FOR ELECTROMAGNETIC SURVEYING

BACKGROUND

1. Field of the Invention

Implementations of various technologies described herein generally relate to methods and systems for electromagnetic surveying.

2. Description of the Related Art

The following descriptions and examples are not admitted to be prior art by virtue of their inclusion within this section.

Electromagnetic surveying of subsurfaces, such as hydrocarbon reservoirs, measures induced electric and magnetic field strengths. The measurements are used to derive an image of the electrical resistivity of the subsurface. This survey technique is typically performed using a marine cable (towed or stationary) and a sensor system deployed from a marine survey vessel. This technique may also include the simultaneous use of a controlled electromagnetic source deployed from the same and/or a different survey vessel.

Typically, electromagnetic measurements are performed by deploying a stationary electromagnetic receiver unit or system on the seafloor. Receiver units are generally equipped with electric and magnetic field sensors, digitizing units, a clock, memory and a power supply. Sea-bottom electromagnetic systems may include a seabed cable deployed from a survey vessel. In addition to the equipment generally found on the aforementioned receiver units, the seabed cable may include a centrally-controlled power supply and a means of data telemetry.

SUMMARY

Described herein are various technologies directed to a sensor cable for surveying. The sensor cable may comprise at least one pair of current sensor electrodes and an amplifier. The current sensor electrodes are disposed along opposite sides of the sensor cable. The current sensor electrodes are configured to detect current in an electromagnetic field transverse to an inline direction of the sensor cable. The amplifier is configured to amplify the current in the electromagnetic field for detection by the electrode pair.

Described herein are also technologies for a marine electromagnetic survey system. The system may comprise a source for generating an electromagnetic field in a subsurface area, a vessel for towing the source, and a sensor cable. The sensor cable may comprise at least one pair of current sensor electrodes and an amplifier. The current sensor electrodes are disposed along opposite sides of the sensor cable. The current sensor electrodes are configured to detect current in an electromagnetic field transverse to an inline direction of the sensor cable. The amplifier is configured to amplify the current in the electromagnetic field for detection by the electrode pair.

Described herein are also technologies for a method for conducting an electromagnetic survey. A sensor cable having at least one pair of current sensor electrodes disposed along opposite sides of the sensor cable may be deployed. An electric current in an electromagnetic field transverse to an inline direction of the sensor cable may be measured using the at least one pair of current sensor electrodes. An electric field strength may be determined using the measured electric current. The electric field strength may be determined according to $E=I/(\sigma S)$, where E is the electric field strength, I is the measured electric current, S is the surface area of the at least one pair of current sensor electrodes and $\sigma$ is the seawater conductivity.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 2A illustrates a segment of a sensor cable in accordance with implementations of various technologies described herein.

FIG. 2B illustrates a segment of a sensor cable in accordance with implementations of various technologies described herein.

FIG. 2C illustrates a side view of current sensor electrodes in accordance with implementations of various technologies described herein.

DETAILED DESCRIPTION

Figure 1:
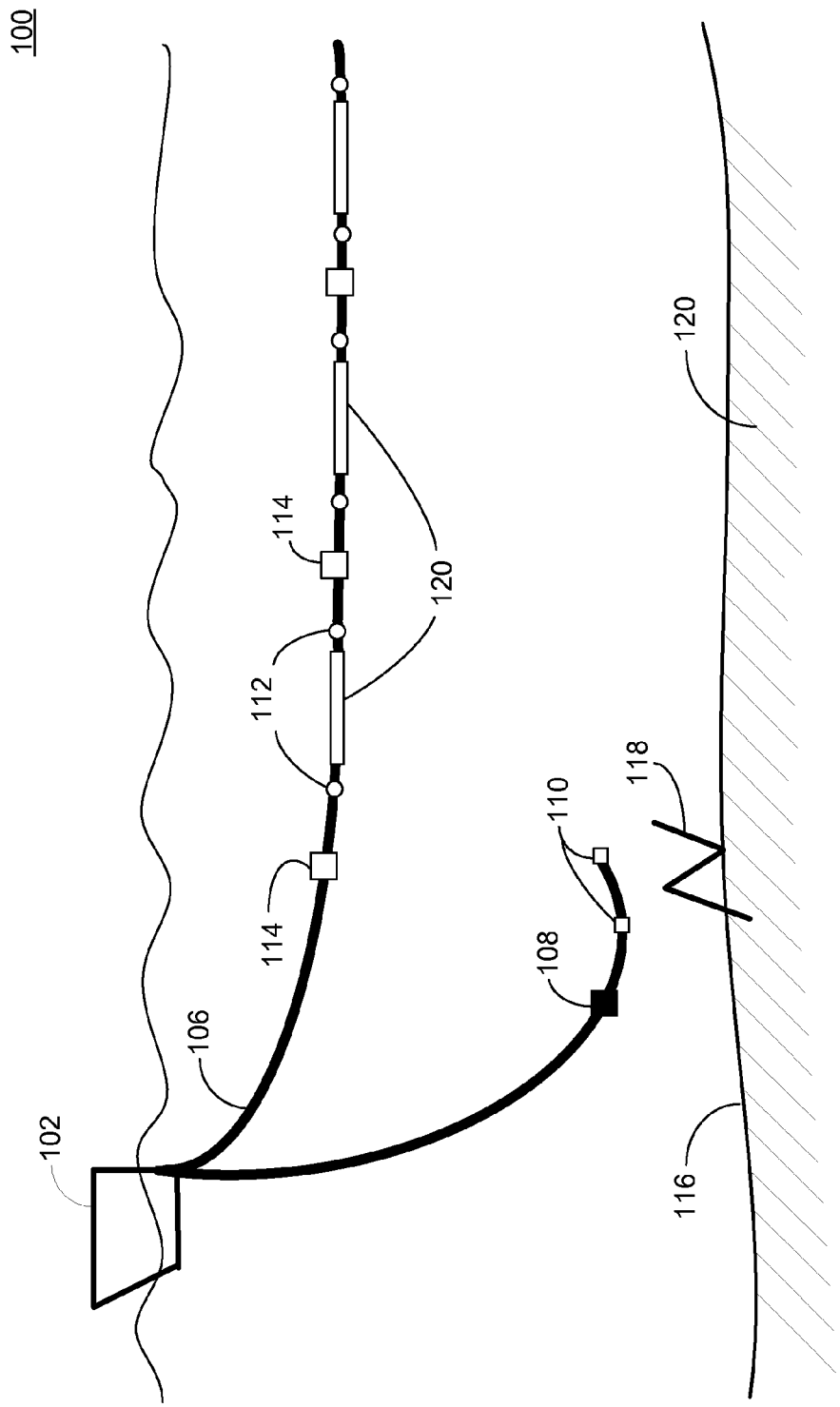
FIG. 1 illustrates a marine electromagnetic survey system in accordance with implementations of various technologies described herein.

FIG. 1 illustrates a marine electromagnetic survey system 100 in accordance with implementations of various technologies described herein. Marine electromagnetic surveying is normally performed by a survey vessel 102 that moves in a predetermined pattern along the surface of a body of water such as a lake or the ocean. The survey vessel 102 is configured to pull a towfish (source) 108, which is connected to a pair of electrodes 110. Typically, the vessel may stop and remain stationary for a period of time during transmission.

At the source 108, a controlled electric current may be generated and sent through the electrodes 110 into the seawater. In one implementation, the electric current generated is in the range of about 0.01 and about 20 Hz. The current creates an electromagnetic field 118 in the subsurface 120 to be surveyed. Alternatively, in one implementation, the electromagnetic field 118 may be generated by magneto-telluric currents instead of the source 108.

The survey vessel 102 may also be configured to tow a sensor cable 106. The sensor cable 106 may be a marine towed cable. The sensor cable 106 may contain sensor housings 112, telemetry units 114, and current sensor electrodes 120. The sensor housings 112 may contain voltage potential electrodes for measuring the electromagnetic field 118 strength created in the subsurface area 120 during the surveying period. The current sensor electrodes 120 may be used to measure electric field strength in directions transverse to the direction of the sensor cable 106 (the y- and z-directions). The telemetry units 114 may contain circuitry configured to determine the electric field strength using the electric current measurements made by the current sensor electrodes 120. The sensor housings 112, the telemetry units 114 and the current sensor electrodes 120 will be described in more detail in the following paragraphs with reference to FIGS. 2A, 2B, 2C and 3. Although various implementations described herein are with reference to current sensor electrodes, it should be understood that in some implementations the sensor cable 106 may include other components, such as seismic hydrophones, accelerometers, geophones and the like. Additionally, the sensor cable 106 may remain stationary in the water or on the seafloor while acquiring data during periods that the vessel 102 is stationary.

FIG. 2A illustrates a cross section of the sensor cable 106 in accordance with one or more implementations of various technologies described herein. The sensor cable 106 may include current sensor electrodes 220 aligned along the sides of the cable. In one implementation, the current sensor electrodes 220 may be configured as pairs of electrodes aligned along the side of the sensor cable 106. For example, the current sensor electrodes 220 may be aligned in horizontal and vertical pairs, as shown in the figure. In one implementation, the current sensor electrodes 220 may be disposed outside the sensor cable 106. The current sensor electrodes 220 may be a foil material, such as gold or silver. However, these are provided merely as examples, and are not intended to limit implementation described herein.

Depending on the position of the sensor cable 106, each electrode pair may measure the horizontal or electric field strength of the electromagnetic field 118. As such, the current sensor electrodes 220 may measure current instead of voltage potential. Electric field strength may then be derived from the current measurement between the current sensor electrodes 220 pairs. Each current sensor electrode pair 220 may be connected to an amplifier 222 to amplify electric current.

FIG. 2B illustrates a segment 200 of the sensor cable 106 in accordance with implementations of various technologies described herein. The segment 300 may be any standard marine towed or stationary cable with the addition of sensor housings 212, telemetry units 214, inclinometers 216, current sensor electrodes 220, and connectors 218. Typically, marine towed or stationary cables are constructed out of segments of 100 meters coupled with connectors 218.

The sensor housings 212 may be part of a short cable insert section placed between the connectors 218 of a standard towed or stationary cable segment. This insert section may be mechanically equivalent to a normal towed or stationary cable segment except that it is of short length.

The sensor housings 212 may contain voltage potential electrodes 230 for measuring the electromagnetic field 118 strength created in the subsurface area 120 during the surveying period. The voltage potential electrodes 230 may measure potential voltage in the direction of the sensor cable (the inline, or x-direction).

The voltage potential electrodes 230 may be surrounded by a conductive gel. The conductive gel may be configured to conduct electrical current to the voltage potential electrodes 230 and keep the voltage potential electrode moist. In one implementation, the conductive gel may consist of silver chloride particles dissolved in the gel while the gel is liquefied.

The sensor housing 212 may be surrounded by a membrane that is configured to contain the conductive gel. Additionally, the membrane may be perforated to allow electric current to pass from the electromagnetic field 118 to the voltage potential electrodes 230.

The length of the sensor housing 212 may be between about 10 centimeters (cm) and about 1 meter (m). Two voltage potential electrodes 230, each located in a different sensor housing 212 may form an electrical pair. The spacing between the voltage potential electrodes 230 in the electrical pair may vary from about 10 to about 300 meter. In some implementations, the spacing may even be greater than 300 meter, as large as 1000 meter. The spacing between the voltage potential electrodes 230 in an electrical pair may govern the signal strength and the signal to noise ratio.

As shown in FIG. 2B, several current sensor electrodes 220 may be coupled together in parallel to create current sensor electrodes tens of meters in length.

The sensor housings 212 and current sensor electrodes 220 may be configured to communicate the electric field measurements to the telemetry units 214. As such, the telemetry units 214 may contain circuitry configured to record the electric field measurements. The telemetry units 214 may then forward the electric field measurements to the surface where they may be used in image processing of the subsurface area 120 at a later time.

In an implementation where the survey vessel 102 tows the sensor cable 106, the telemetry units 214 may record the electric field measurement detected by the current sensor electrodes 220 and the voltage potential electrodes 230 within the sensor housings 212. In an implementation where the sensor cable 106 is deployed on the seabed 116, a recording buoy (not shown) attached to the sensor cable 106 may provide an alternative means for providing power and data gathering capabilities.

In one implementation, the segment 200 may contain inclinometers 216 to determine the orientation of the current sensor electrodes 220 relative to the horizontal plane. Because the sensor cable 106 may twist—either intentionally (via mechanical rotational forces applied), or unintentionally, as it is towed, the inclinometer measurements may be used to convert the measurements of the current sensor electrodes 220 to horizontal and vertical electric field strengths.

Figure 3:
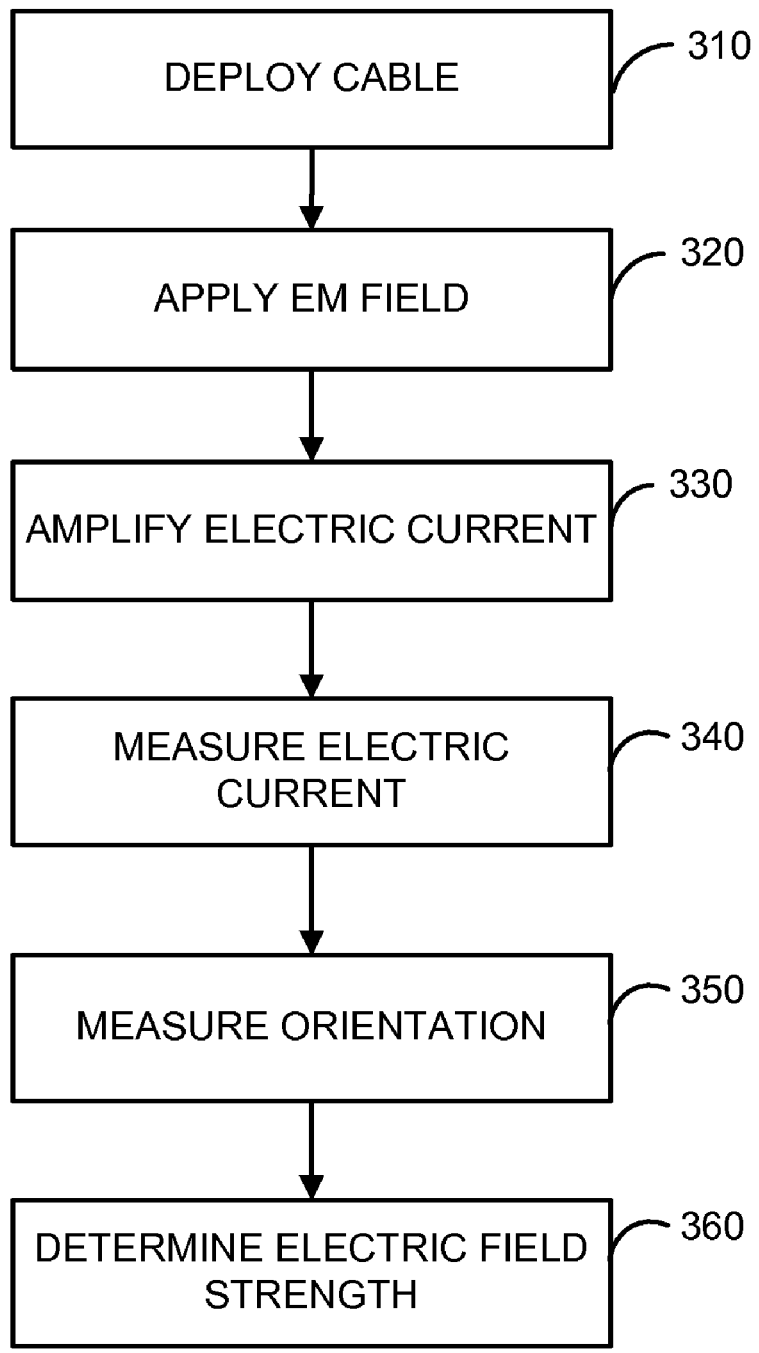
FIG. 3 illustrates a flow diagram of a method for conducting an electromagnetic survey in accordance with implementations of various technologies described herein.

FIG. 3 illustrates a flow diagram of a method 300 for conducting an electromagnetic survey in accordance with implementations of various technologies described herein. At step 310, the sensor cable 106 may be deployed. In one implementation, the survey vessel 102 may deploy the sensor cable 106 by towing the sensor cable 106 over the subsurface area 120 to be surveyed.

In another implementation, the sensor cable 106 may be deployed by placing the sensor cable 106 on the seabed floor 116. In such an implementation, the sensor cable 106 may not include sensor housings 212. Rather, the voltage potential electrodes 230 may be attached to the sensor cable 106.

At step 320, the source 108 may apply an electromagnetic field to the subsurface area 120 being surveyed by generating an electric current that passes through the electrodes 110 into the seawater. In an implementation where the sensor cable 106 is placed on the seabed floor 116, the source 108 may be towed over the sensor cable 106. The current generated by the source 108 may range from about 0.1 Hz to about 10 Hz.

In one implementation, the electromagnetic field 118 may not be applied as described in step 320. Instead, the electromagnetic field 118 may be caused by magneto-telluric currents.

The electric current within the electromagnetic field 118 may be too weak to record. As such, at step 330, the electric current may be amplified by amplifiers contained within the sensor cable 106.

At step 340, the electric current in an electromagnetic field transverse to an inline direction of the sensor cable 106 may be detected or measured by the current sensor electrodes 220.

At step 350, the orientation of the current sensor electrodes 220 relative to a horizontal plane may be measured by the inclinometers 216. The orientation may then be used to convert the electric current measurement to horizontal and vertical electric field strengths.

At step 360, the electric field strength may be determined using the electric current measurements. The electric field strength may be determined according to formula $E=I/(\sigma S)$ where E is the electric field strength, I is the measured electric current, S is the electrode surface area (i.e., $S=dx*dz$), and $\sigma$ is the seawater conductivity.

If the resistance of the current sensor electrodes 220 equals the seawater resistance, the electrode system may essentially be invisible to the surrounding electromagnetic field 118. As such, the conversion from electric current to electric field strength follows the simple formula $E=I/(\sigma S)$ where E is the electric field strength, I is the measured electric current, S is the electrode surface area (i.e., $S=dx*dz$), and $\sigma$ is the seawater conductivity. FIG. 2C illustrates a side view of current sensor electrodes 220 having dx and dz indicated thereon. A typical total electrode surface area may be one square meter. In one implementation, the sensor cable 106 may also be equipped with at least one seawater electrical conductivity sensor (not shown) to facilitate the conversion or calculation from electric current to electric field strength.

The signal strength and the signal to noise ratio of the measurements for the current sensor electrodes 220 may be governed by the total surface area of the current sensor electrodes 220. In one implementation, the total surface area of the current sensor electrodes is 1 square meter.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A sensor cable for surveying, comprising:
    at least one pair of current sensor electrodes disposed along opposite sides of the sensor cable, wherein the at least one pair of current sensor electrodes is configured to detect current in an electromagnetic field transverse to an inline direction of the sensor cable; and
    an amplifier configured to amplify the current in the electromagnetic field for detection by the electrode pair.

2. The sensor cable of claim 1, further comprising;
    an inclinometer configured to measure an orientation of the at least one pair of current sensor electrodes relative to a horizontal plane.

3. The sensor cable of claim 2, wherein the orientation is used to convert the electric current to horizontal and vertical electric field strengths.

4. The sensor cable of claim 1, wherein the at least one pair of current sensor electrodes comprises:
    a first pair of current sensor electrodes disposed along a first opposite sides of the cable and
    a second pair of current sensor electrodes disposed along a second opposite sides of the cable substantially perpendicular to the first opposite sides; and
    an inclinometer configured to measure an orientation of the first pair and the second pair relative to a horizontal plane.

5. The sensor cable of claim 1, wherein the at least one pair of current sensor electrodes is made of foil material.

6. The sensor cable of claim 1, wherein the at least one pair of current sensor electrodes is disposed outside the sensor cable.

7. The sensor cable of claim 1, further comprising:
    a voltage potential electrode pair configured to detect a strength of the electromagnetic field in an inline direction of the cable.

8. The sensor cable of claim 7, further comprising:
    a first sensor housing, comprising:
        a first electrode of the voltage potential electrode pair;
        a conductive gel surrounding the first electrode, wherein the conductive gel is configured to conduct electrical current to the first electrode and keep the first electrode moist; and
        a first membrane surrounding the conductive gel, wherein the first membrane is configured to hold the conductive gel in contact with the first electrode and permit electric current to flow between a surrounding medium and the conductive gel; and
    a second sensor housing, comprising:
        a second electrode of the voltage potential electrode pair;
        a conductive gel surrounding the second electrode, wherein the conductive gel is configured to conduct electrical current to the second electrode and keep the second electrode moist; and
        a second membrane surrounding the conductive gel, wherein the second membrane is configured to hold the conductive gel in contact with the second electrode and permit electric current to flow between a surrounding medium and the conductive gel.

9. A marine electromagnetic survey system, comprising:
    a source for generating an electromagnetic field in a subsurface area; and
    a sensor cable comprising:
        at least one pair of current sensor electrodes disposed along opposite sides of the sensor cable, wherein the at least one pair of current sensor electrodes is configured to detect an electric current in an electromagnetic field transverse to an inline direction of the sensor cable; and
        an amplifier configured to amplify the electric current in the electromagnetic field for detection by the electrode pair.

10. The system of claim 9, wherein the source comprises magneto-telluric currents.

11. The system of claim 9, further comprising a vessel for towing the source.

12. The system of claim 9, wherein the sensor cable further comprises an inclinometer configured to measure an orientation of the at least one pair of current sensor electrodes relative to a horizontal plane.

13. The system of claim 9, wherein the sensor cable further comprises:
    a housing, comprising:
        one of more electrodes;
        a conductive gel surrounding the one or more electrodes, wherein the conductive gel is configured to conduct electrical current to the one or more electrodes and keep the one or more electrodes moist; and
        a membrane surrounding the conductive gel, wherein the membrane is configured to hold the conductive gel in contact with the one or more electrodes and permit electric current to flow between a surrounding medium and the conductive gel.

14. A method for conducting an electromagnetic survey, comprising:

deploying a sensor cable having at least one pair of current sensor electrodes disposed along opposite sides of the sensor cable;

measuring an electric current in an electromagnetic field transverse to an inline direction of the sensor cable using the at least one pair of current sensor electrodes; and determining an electric field strength using the measured electric current.

15. The method of claim 14, wherein the electric field strength is determined according to $E=I/(\sigma S)$, where E is the electric field strength, I is the measured electric current, S is the surface area of the at least one pair of current sensor electrodes and $\sigma$ is the seawater conductivity.

16. The method of claim 14, further comprising amplifying the electric current.

17. The method of claim 14, further comprising measuring an orientation of the at least one pair of current sensor electrodes relative to a horizontal plane.

18. The method of claim 14, further comprising converting the electric current to horizontal and vertical electric field strengths.

19. The method of claim 14, wherein deploying the sensor cable comprises towing the cable over a subsurface area to be surveyed.

20. The method of claim 14, wherein deploying the sensor cable comprises placing the cable on a seabed over a subsurface area to be surveyed.

21. The method of claim 14, further comprising generating an electric current of about 0.1 to about 10 Hz, thereby creating the electromagnetic field.

22. The method of claim 14, further using the electric field strength for hydrocarbon exploration.

23. The method of claim 14, further using the electric field strength to derive an image of the electrical resistivity of a subsurface area.

* * * * *

UNITED STATES PATENT AND TRADEMARK OFFICE
CERTIFICATE OF CORRECTION

PATENT NO. : 7,999,552 B2  
APPLICATION NO. : 12/132534  
DATED : August 16, 2011  
INVENTOR(S) : Babour et al.

Page 1 of 1

It is certified that error appears in the above-identified patent and that said Letters Patent is hereby corrected as shown below:

Figure 2B should be replaced with the following figure (which correctly identifies segment 200)

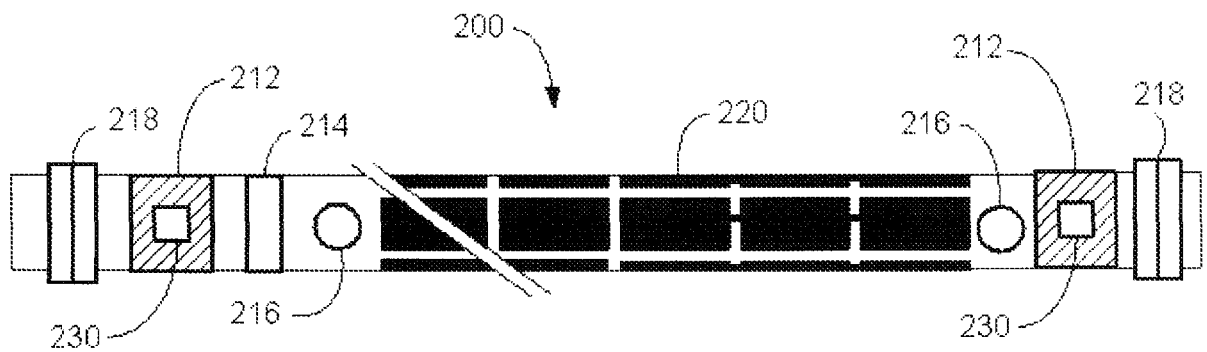

FIG. 2B

Column 3, line 34:

should read – "described herein. The segment 200 may be any standard"

instead of "described herein. The segment 300 may be any standard"

Signed and Sealed this  
Fifteenth Day of May, 2012

David J. Kappos  
*Director of the United States Patent and Trademark Office*